United States Patent [19]
Forster

[11] Patent Number: 5,704,274
[45] Date of Patent: Jan. 6, 1998

[54] AXIAL PISTON MACHINE

[75] Inventor: Franz Forster, Karlstadt-Mühlbach, Germany

[73] Assignee: Linde Aktiengesellschaft, Germany

[21] Appl. No.: 681,266

[22] Filed: Jul. 22, 1996

[30] Foreign Application Priority Data

Jul. 28, 1995 [DE] Germany .................. 195 27 645.0

[51] Int. Cl.$^6$ ...................................... F16J 15/18
[52] U.S. Cl. ................... 92/165 R; 92/71; 417/269; 74/60
[58] Field of Search .................. 92/122, 57, 71, 92/165 R; 417/269; 91/499; 74/60

[56] References Cited

U.S. PATENT DOCUMENTS

| | | | |
|---|---|---|---|
| 3,938,397 | 2/1976 | Rasmussen | 74/60 |
| 3,939,717 | 2/1976 | Teisew | 74/60 |
| 5,382,139 | 1/1995 | Kawaguchi et al. | 417/269 |
| 5,490,767 | 2/1996 | Kanou et al. | 417/269 |

FOREIGN PATENT DOCUMENTS 415432  6/1925  Germany .

*Primary Examiner*—Thomas E. Denion
*Attorney, Agent, or Firm*—Webb Ziesenheim Bruening Logsdon Orkin & Hanson, P.C.

[57] ABSTRACT

An axial piston machine has a rotary shaft, a first group of concentric radially spaced cylindrical bores, and a second group of concentric radially spaced cylindrical bores axially spaced from and aligned with said first group of cylindrical bores. A wobble plate is located between the groups of cylindrical bores and is positioned at an angle relative to the axis of rotation of the rotary shaft and is connected to said rotary shaft. A piston is located in each pair of cylindrical bores for reciprocal movement, and each piston includes two axially spaced piston segments and a bridge segment connecting the piston segments and attaching the piston segments to the wobble plate. Each bridge segment has a guide which is effective in the peripheral direction to contact a corresponding guide on adjacent bridge segments to prevent rotation of the pistons.

2 Claims, 2 Drawing Sheets

AXIAL PISTON MACHINE

BACKGROUND OF THE INVENTION

1. Field of the Invention

This invention relates generally to a swash plate type axial piston machine having a housing with a first group of concentrically located radially spaced cylindrical bores and a second group of concentrically located radially spaced cylindrical bores axially spaced from the first group of axial bores. A wobble plate is positioned at an angle relative to the axis of rotation of the axial piston machine and is operatively connected to a rotary shaft.

2. Description of Related Prior Art

A prior art axial piston machine is described in DE-PS 415 432. Each piston in that machine is secured against rotation around its center axis by a rod which is connected to the housing. For this purpose, each piston is provided with two spaced radial tabs which extend radially outwardly with respect to the axis of rotation of the axial piston machine. The rod is flattened on both sides and is located between the tabs. The velocity which occurs during the oscillating movement of the pistons acts to prevent rotation of the pistons.

Pistons are arranged for axial movement in the cylindrical bores, and the opposed outer ends of each piston are contacted by a pressure medium for axial movement of the pistons. Each piston consists of two aligned coaxial segments which are axially separated. Each piston segment is located in a cylinder bore which is aligned with and coaxial with another cylindrical bore and the piston segments are connected to one another by a bridge segment. Each bridge segment is operatively connected to a wobble plate and is prevented from rotating around its center axis.

SUMMARY OF THE INVENTION

An object of the present invention is to provide an axial piston machine having a swash plate design having a simplified and improved method of securing the pistons against rotation around the center axes of the pistons. The invention is achieved by providing the bridge segments with guide surfaces which contact a corresponding guide surface on the bridge segments of adjacent pistons. Each piston is spaced from axially aligned neighboring pistons by the edges of a bridge segment. The result is that the piston segments located on the one side of the wobble plate, which are under high pressure, rotate in a direction opposite to the direction of rotation of the piston segments, which are located on the opposite side of the wobble plate, which piston segments are also under high pressure. The rotational forces therefore counteract and consequently neutralize one another so that no support is necessary with respect to the machine housing.

Additionally, only a low relative velocity is created between adjacent bridge segments of the pistons because of the slight advance or lag of adjacent pistons so that the connection of the pistons results in a high resistance to wear. On the other hand, in the axial piston machine of the prior art, the portion of the machine which secures the pistons against individual rotation is always exposed to the full velocity of the pistons, which results in energy losses and very rapid wear.

In respect of manufacturing, it is advantageous if the guide surfaces of the bridge segments are effective in the circumferential direction when viewed along the axis of the axial piston machine and are sectors of a circle. The guide surfaces are formed in the radially outer area of the sectors of a circle and a wedge-shaped space, the width of which becomes larger as the radius decreases, is formed between adjacent bridge segments. On one hand, precisely defined points for the application of force are provided between adjacent sectors, and on the other hand the force opposite to the rotational movement of the piston around its center axis is always applied to the longest possible lever arm.

A complete understanding of the invention will be obtained from the following description when taken in connection with the accompanying drawing figures wherein like reference characters identify like parts throughout.

DETAILED DESCRIPTION OF THE PREFERRED EMBODIMENT

Figure 1:
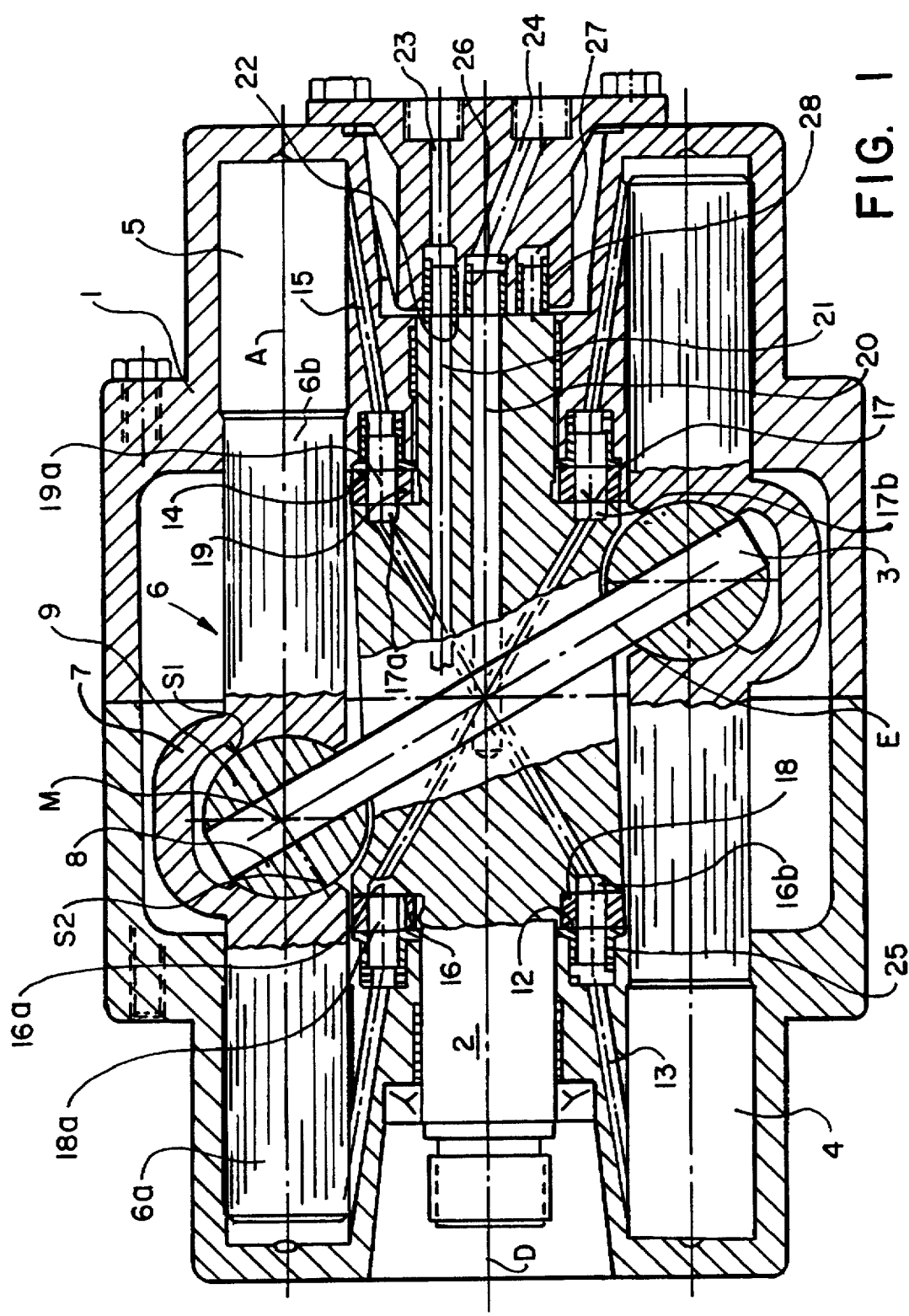
FIG. 1 is a longitudinal section through an axial piston machine according to the invention.
Figure 2:
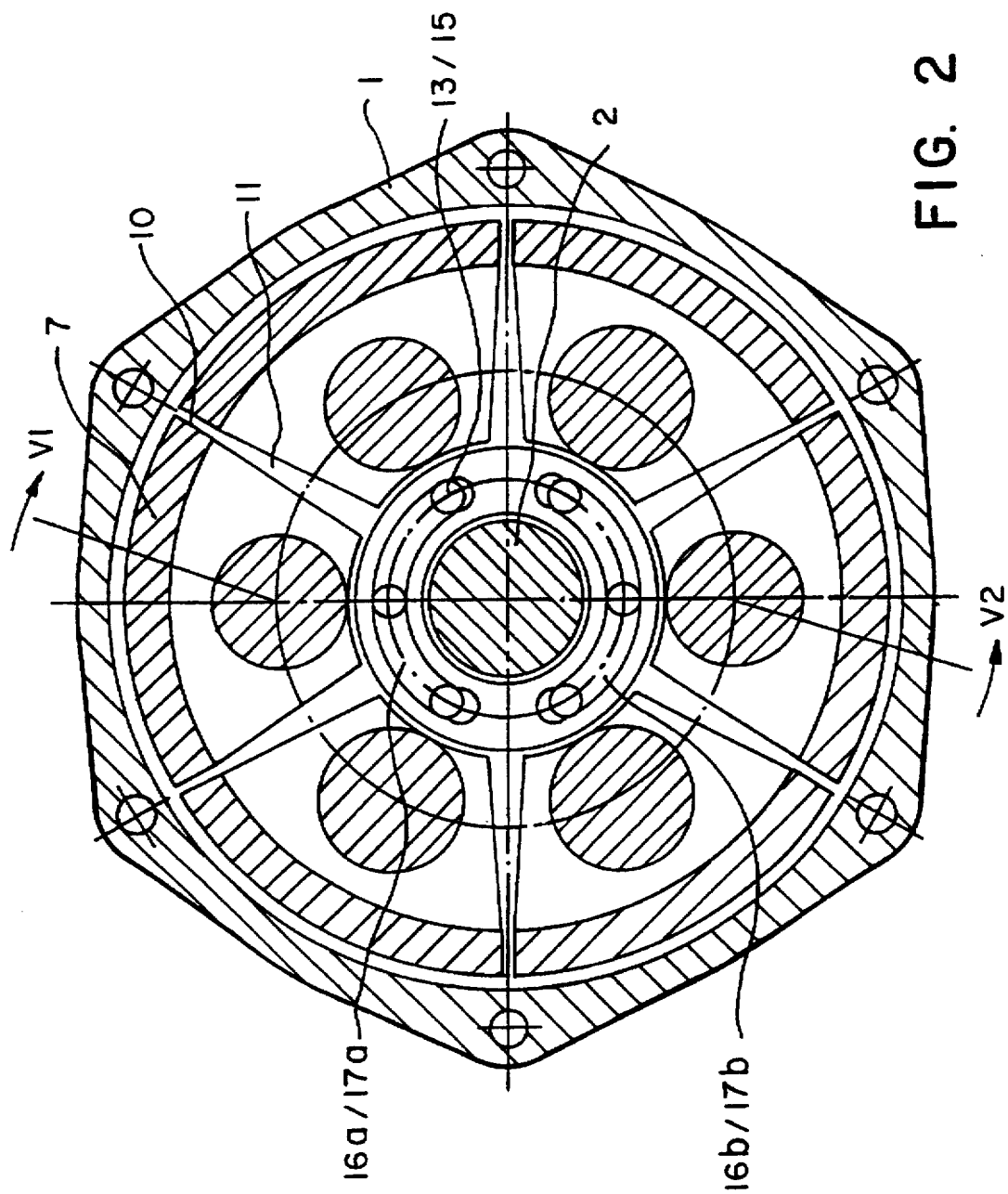
FIG. 2 is a cross section through the axial piston machine shown in FIG. 1.

The swash plate type axial piston machine shown in FIGS. 1 and 2 of the drawings has an outer housing 1 and a centrally located rotary shaft 2 mounted on bearings for rotation in the housing 1. The shaft 2 is operatively connected to a wobble plate 3. The angle of inclination of the wobble plate 3 is constant with respect to a plane which is perpendicular to the axis of rotation D of the shaft 2.

A first group of radially spaced concentric cylindrical bores 4 are located in the housing 1. A second group of radially spaced concentric cylindrical bores 5 are located in the housing 1 parallel to and axially spaced from the first group.

The wobble plate 3 is operatively connected to a plurality of pistons 6, each of which has a first piston segment 6a and a coaxial second piston segment 6b which is axially spaced from the first piston segment. The two piston segments 6a and 6b have the same diameter. A bridge segment 7 connects the segments 6a and 6b of each piston 6 for longitudinal movement in the opposed cylindrical bores 4 and 5 of the first and second groups of cylindrical bores.

Depending upon the intended use of the machine, the ends of the pistons will be pressurized with a pressure medium (e.g. operate as a hydraulic motor) or can displace a pressure medium (e.g. operate as a pump). In operation, as in similar devices of the prior art, a relative velocity occurs which is perpendicular to the center axes of the pistons 6 and tangential to the wobble plate 3.

The pistons located on the one side of the wobble plate 3 are pressurized with a high pressure medium and rotate in the direction of the arrow V1 which is opposite to the direction of rotation of the arrow V2 of the pistons located on the opposite side of the wobble plate 3 which are also pressurized with a high pressure medium. The rotational forces therefore counteract and neutralize one another.

The bridge segment 7 of each piston 6 embraces a part of two support bodies 8 and 9 which are segments of a sphere with coaxial axes S1 and S2. The wobble plate 3 is located between the surfaces of the support bodies 8 and 9 which are surrounded by a common sphere formed by the bridge segment 7. The center M of the common sphere preferably lies on the center line E of the wobble plate 3 which is located between the support bodies 8 and 9. The center M of the common sphere is located on the center axis A of the piston 6. As a result of the configuration of the axial piston machine described above, a much larger angle of inclination of the wobble plate 3 is possible than in similar systems of the prior art, which results in a significant increase in power.

Means are provided to prevent each piston 6 from rotating around its center axis A. Thus, the outer edges of the wedge-shaped bridge segments 7 are provided with guide surfaces 10 which can come into contact with corresponding guide surfaces 10 on the adjacent bridge segments 7 as shown in FIG. 2 of the drawings.

The protection against rotation of the pistons 6 means that only a small relative velocity is present between the bridge segments 7 of the pistons which are next to one another. The result is that the means which secure the pistons against rotation have a high resistance to wear. In the axial piston machine of the prior art, the means which secure the pistons against rotation about their axes are always exposed to the full piston velocity which results in very rapid wear.

The guide surfaces 10 of the bridge segments 7, when viewed in the axial direction of the axial piston machine, are in the form of the edges of a sector of a circle. To obtain precisely defined points for the application of forces, the guide surfaces 10 are effective only in the radially outer edges of the sectors of the circle. In the inner area of the sector of the circle, a wedge-shaped free space 11 is formed between adjacent bridge segments 7 and the clear width of the free spaces 11 becomes smaller as the radius decreases. As a result of this arrangement, the force which acts opposite to the direction of rotation of the piston 6 around its center axis A is always applied to the longest possible lever arm.

A first orifice surface 12 is perpendicular to the axis of rotation D of the shaft 2. The orifice is connected to the housing 1 and supply passages 13 formed in the housing are connected to the cylindrical bores 4 of the first group. A second orifice surface 14 is parallel to the first orifice surface 12 and spaced from it. It is also formed in the housing 1 and supply passages 15 formed in the housing are connected to the cylindrical bores 5 of the second group. Rotating control surfaces 16 and 17 are located on the rotating control surface 2 for orifice surfaces 12 and 14, respectively. Kidney-shaped control nodules 16a and 16b are formed in the control surface 16 for the periodic supply of a pressure medium to the closed ends of the cylindrical bores 4. Likewise, kidney-shaped control nodules 17a and 17b are formed in the control surface 17 for the periodic supply of a pressure medium to the closed ends of the cylindrical bores 5. In the illustrated embodiment, the kidney-shaped control nodules 16a and 16b, 17a and 17b are machined into the shaft 2.

A distributor ring 18 is located between the orifice surface 12 and the control surface 16 to improve the distribution of forces and to improve the wear resistance. The distributor ring 18 is connected to the shaft 2 and is provided with holes 18a which are in communication with the supply passages 13. Analogously, a distributor ring 19 is located between the orifice surface 14 and the control surface 17 which is connected to the shaft 2 and is provided with holes 19a which are in communication with the supply passages 15.

The kidney-shaped control nodules 16a and 17b are connected to a passage 20 and the kidney-shaped control nodules 16b and 17a are connected to a passage 21. The passages 20 and 21 emerge opposite a connecting surface 22 which is formed on the housing 1 and is perpendicular to the axis of rotation D of the shaft 2. A first connecting passage 23 and, at a radial distance from it, a second connecting passage 24 open onto the connecting surface 22 opposite the ends of one of the connecting passages 20 and 21.

An axially movable, T-shaped bushing 25 is pressed toward the control surface 16 to minimize the leakage losses in spite of the manufacturing tolerances for the machine and to make self-adjustment of the control system possible. The bushing prevents an increase in leakage losses in each of the orifices of the supply passages 13 and 15 caused by wear. The bushing 25 is maintained in contact against a distributor ring 18 or 19 by a spring force and by the pressure of the pressure medium and thereby provides a self-adjusting sealing action.

An axially movable bushing 26 is pushed toward the end of shaft 2 by the force of a spring and by the pressure of the pressure medium located in the end of the centrally-located second connecting passage 24 in the connecting surface 22. Since the first connecting passage 23 and the connecting passage 21 are located eccentrically of each other, the first connecting passage 23 is connected with a ring-shaped groove 27 recessed from the control surface 22. A ring-shaped bushing 28 is located in the ring-shaped groove 27 to create a seal and is pushed toward the machine shaft 2 by the force of a spring and by the pressure of the pressure medium.

While the invention is described in detail herein, it will be appreciated by those skilled in the art that various modifications and alternatives to the arrangement can be developed in light of the overall teachings of the disclosure. Accordingly, the particular arrangement is illustrative only and is not limiting as to the scope of the invention which is to be given the full breadth of the appended claims and any and all equivalents thereof.

I claim:

1. A swash plate type axial piston machine having a rotary shaft, a first group of concentric radially spaced cylindrical bores, and a second group of concentric radially spaced cylindrical bores axially spaced from and aligned with said first group of cylindrical bores, a wobble plate located between said first and second groups of cylindrical bores and positioned at an angle in relation to the axis of rotation of said rotary shaft and operatively connected to said rotary shaft, a piston located in each pair of said cylindrical bores for reciprocal movement in said pair of cylindrical bores, whereby each of said pistons is provided for the displacement of a pressure medium or for pressurization by a pressure medium on both ends of said piston, each of said pistons including two axially spaced piston segments located in a bore in one of said pairs of cylindrical bores, a bridge segment connecting said piston segments and attaching said piston segments to said wobble plate, and guide means on each of said bridge segments which are effective in the peripheral direction to contact corresponding guide means on said bridge segments of adjacent pistons for securing each of said pistons against rotation around the center axis of said piston, wherein said guide means on each of said bridge segments which are effective in the peripheral direction have a lateral cross section transverse to the axis of said rotary shaft in the shape of a sector of a circle, and wherein said guide means having a lateral cross section transverse to the axis of said rotary shaft in the shape of a sector of a circle, said sector having opposed radial edges and as the radius decreases a wedge-shaped free space is formed between said radial edges of adjacent bridge segments.

2. An axial piston machine as set forth in claim 1, wherein each of said bridge members has a circumferential peripheral edge having opposed ends and said guide means on each of said bridge segments is said opposed ends of said circumferential peripheral edge of said sector of a circle.

* * * * *